G. DOYLE.
Bomb Lance.
No. 21,949.  Patented Nov. 2, 1858.
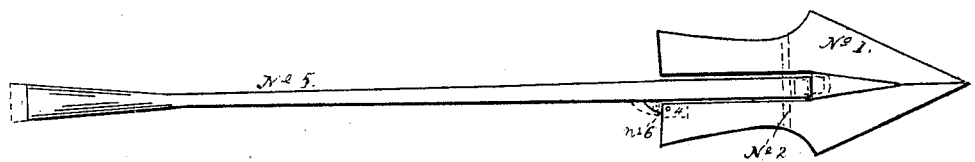
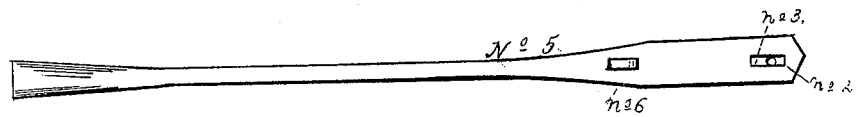
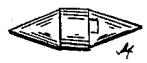

UNITED STATES PATENT OFFICE.

GEO. DOYLE, OF PROVINCETOWN, MASSACHUSETTS.

IMPROVED HARPOON.

Specification forming part of Letters Patent No. 21,949, dated November 2, 1858.

*To all whom it may concern:*

Be it known that I, GEORGE DOYLE, of Provincetown, in the county of Barnstable and Commonwealth of Massachusetts, have invented a new and Improved Harpoon or Whaling-Iron; and I do hereby declare that the following is a full, clear, and exact description of the construction and operation of the same, reference being had to the accompanying drawings, forming a part of this specification.

To enable others skilled in the art to make and use my invention, I will now describe its construction and operation.

The nature of my invention consists in so attaching the shank to the harpoon-head that when the latter has entered a fish and turns it shall present the broad flat side, instead of the edge, to the resisting body, and thus become less liable to tear out.

1 is the head, of cast-steel or other suitable material and of any desirable size, and shaped either like the one represented in the figure or any other that is or may be used, the peculiarity of my invention consisting in making a longitudinal slot through the head, extending from the center backward, as shown in the figure, to receive, as hereinafter described, the shank 5, which is made of rod-iron or other suitable material.

2 is a steel pin passing through the head and an oblong slot, 3, in the shank. 6 is a projection or lip on the shank, and 4 is a corresponding cavity or mortise in the head to receive said lip.

When the harpoon is to be thrown the shank is pressed into the head as far as pin 2 and slot 3 will allow, while lip 6 enters cavity 4, and thereby prevents the head from turning; but after the harpoon has entered a fish and any draft comes upon the shank the latter slips backward from the head as far as the slot 3 and pin 2 will allow, and lip 6 slips back out of mortise 4, so that the head is left free to turn upon the pin 2 and present one of its flat sides to the resisting body, instead of presenting its sharp and narrow edges, as is the case with all other instruments of the kind that have ever been made, and as the force required to withdraw the harpoon is exactly in proportion to the area of the head presented to the body of the fish at or nearly at a right angle to the shank, it follows that my harpoon will be much less liable to tear out than any other extant.

What I claim as my invention, and desire to secure by Letters Patent, is—

1. Attaching the shank of the harpoon to the head, so that when the latter turns in the fish the flat side, instead of the edge, shall be presented to the resisting body, substantially as described.

2. The slots 3 and 4 and lip 6, operating substantially as set forth, and for the object specified.

GEORGE DOYLE.

Witnesses:
JONATHAN NICKERSON, Jr.,
CHARLES H. GRAY.